United States Patent
Gunturu et al.

(10) Patent No.: US 11,436,102 B2
(45) Date of Patent: Sep. 6, 2022

(54) LOG-STRUCTURED FORMATS FOR MANAGING ARCHIVED STORAGE OF OBJECTS

(71) Applicant: VMware, Inc., Palo Alto, CA (US)

(72) Inventors: Vamsi Gunturu, Cupertino, CA (US); Wenguang Wang, Santa Clara, CA (US); Junlong Gao, Mountain View, CA (US); Ilia Langouev, Santa Cruz, CA (US); Petr Vandrovec, Cupertino, CA (US); Maxime Austruy, Lausanne (CH); Ilia Sokolinski, Boston, MA (US); Satish Pudi, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 231 days.

(21) Appl. No.: 16/998,060

(22) Filed: Aug. 20, 2020

(65) Prior Publication Data

US 2022/0058094 A1 Feb. 24, 2022

(51) Int. Cl.
*G06F 16/00* (2019.01)
*G06F 11/14* (2006.01)
*G06F 11/20* (2006.01)
*G06F 16/17* (2019.01)
*G06F 16/22* (2019.01)
*G06F 16/185* (2019.01)
*G06F 3/06* (2006.01)

(52) U.S. Cl.
CPC ........ *G06F 11/1469* (2013.01); *G06F 3/0608* (2013.01); *G06F 3/0641* (2013.01); *G06F 11/1435* (2013.01); *G06F 11/1451* (2013.01); *G06F 11/1453* (2013.01); *G06F 11/1461* (2013.01); *G06F 11/1464* (2013.01); *G06F 11/2023* (2013.01); *G06F 16/1734* (2019.01); *G06F 16/185* (2019.01); *G06F 16/2246* (2019.01); *G06F 3/067* (2013.01); *G06F 2201/84* (2013.01)

(58) Field of Classification Search
CPC .. G06F 11/1469; G06F 3/0608; G06F 3/0641; G06F 11/1435; G06F 11/1451; G06F 11/1453; G06F 11/1461; G06F 11/1464; G06F 11/2023; G06F 16/1734; G06F 16/185; G06F 16/2246; G06F 3/067; G06F 2201/84; G06F 2201/815; G06F 11/1471; G06F 11/2028; G06F 11/2046
See application file for complete search history.

(56) References Cited

U.S. PATENT DOCUMENTS

2021/0342297 A1* 11/2021 Gupta ................... G06F 16/128

* cited by examiner

*Primary Examiner* — Tyler J Torgrimson

(57) ABSTRACT

Solutions for managing archived storage include receiving, at a first node, a snapshot comprising object data (e.g., a virtual machine disk snapshot) from a second node (e.g., a software defined data center), and storing the snapshot in a tiered structure that includes a data tier and a metadata tier. Snapshots may be used for fail-over operations and/or backups, to support disaster recovery. The data tier comprises a log-structured file system (LFS), and the metadata tier comprises a content addressable storage (CAS) identifying addresses within the LFS. The metadata tier also comprises a logical layer indicating content in the CAS. Segment cleaning of the data tier is performed using a segment usage table (SUT). Some examples include performing a fail-over operation from the second node to a third node using at least the stored snapshot for workload recovery. In some examples, the CAS comprises a log-structured merge-tree (LSM-tree).

20 Claims, 10 Drawing Sheets

LOG-STRUCTURED FORMATS FOR MANAGING ARCHIVED STORAGE OF OBJECTS

BACKGROUND

Archival storage of large amounts of data is used for backups and disaster recovery, for example, fail-over from a primary software defined data center (SDDC) to a secondary SDDC. However, managing the storage of large amounts of data efficiently, in terms of access time, resource utilization, and financial costs, may depend heavily on the schema used. For example, various storage solutions may charge different rates for the volume of storage reserved or used but, in exchange, provide different access speeds. Additionally, some storage solutions may charge based on the access activity, such as writing and reading. Further complicating the storage solution landscape is that some versioned objects, such as virtual machine disks (VMDKs) present some storage constraints.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Solutions for managing archived storage include receiving, at a first node, from an upload agent at a second node (e.g., a software defined data center (SDDC)), a snapshot comprising object data (e.g., virtual machine disk (VMDK) data); storing the snapshot in a primary storage in a tiered structure, wherein the tiered structure comprises a data tier and a metadata tier, wherein the data tier comprises a log-structured file system (LFS) for storing the snapshot, wherein the metadata tier comprises a content addressable storage (CAS) identifying addresses within the LFS, and wherein the metadata tier further comprises a logical layer indicating content in the CAS; and performing segment cleaning of the data tier using a segment usage table (SUT).

BRIEF DESCRIPTION OF THE DRAWINGS

The present description will be better understood from the following detailed description read in the light of the accompanying drawings, wherein.

DETAILED DESCRIPTION

Aspects of the disclosure manage archived storage. A first node receives object data (e.g., virtual machine disk (VMDK) data), at a first node, from an upload agent at a second node (e.g., a software defined data center (SDDC)). The snapshot is stored in a primary storage in a tiered structure. The tiered structure comprises a data tier and a metadata tier. The data tier comprises a log-structured file system (LFS) for storing the snapshot, and the metadata tier comprises a content addressable storage (CAS) identifying addresses within the LFS. The metadata tier further comprises a logical layer indicating content in the CAS. Segment cleaning of the data tier using a segment usage table (SUT) is performed. Some examples include performing a fail-over operation from the second node to a third node using at least the stored snapshot for workload recovery. In some examples, the CAS comprises a log-structured merge-tree (LSM-tree).

Aspects of the disclosure improve the speed, efficiency, and cost of computer storage (e.g., speeding data writing and/or reading) by storing snapshots in the tiered structure. Aspects of the disclosure further improve the speed, efficiency, and cost of computer storage by performing segment cleaning of the data tier (of the tiered structure) using a SUT. Efficiency and speed improvements are provided by the use of the CAS as an intermediate tier between the logical layer and the LFS. Some aspects of the disclosure additionally improve efficiency by storing the CAS in an LSM-tree.

Figure 1:
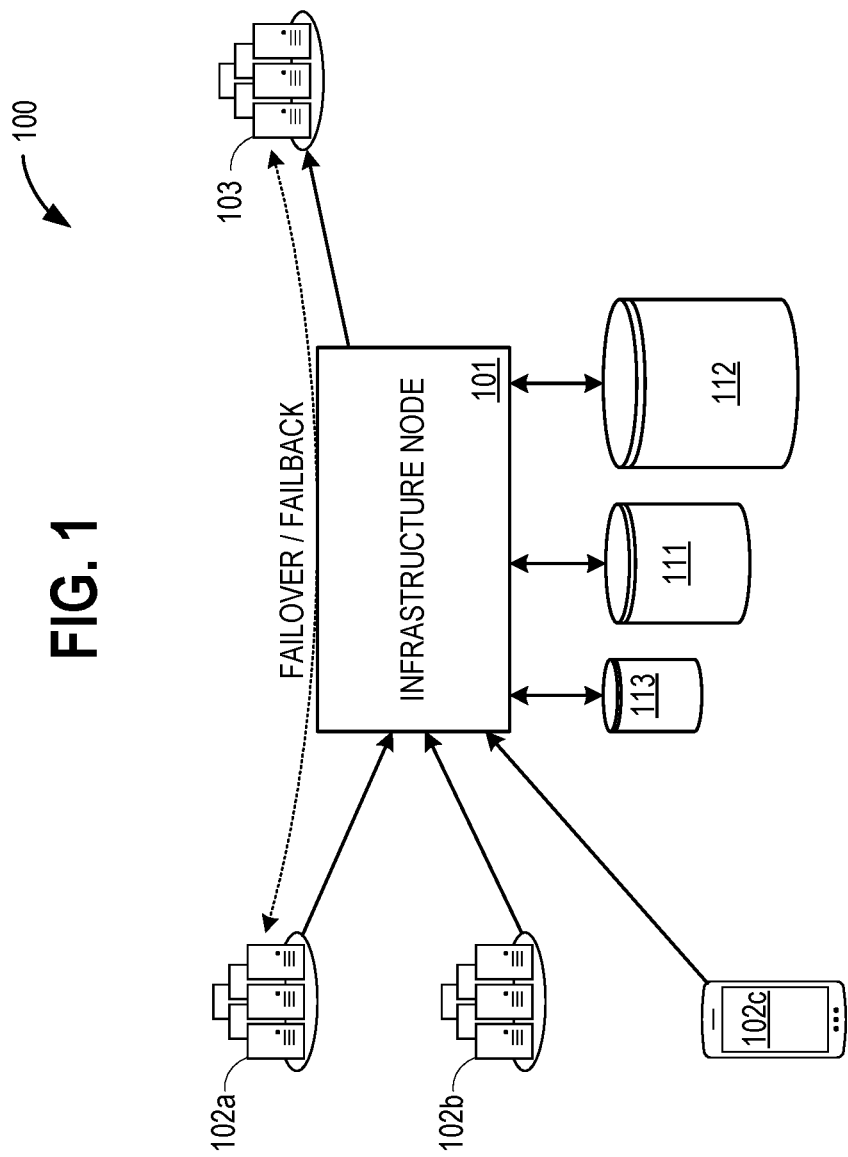
FIG. 1 illustrates an architecture that can advantageously support managing archived storage, for example storage of versioned objects.
Figure 2:
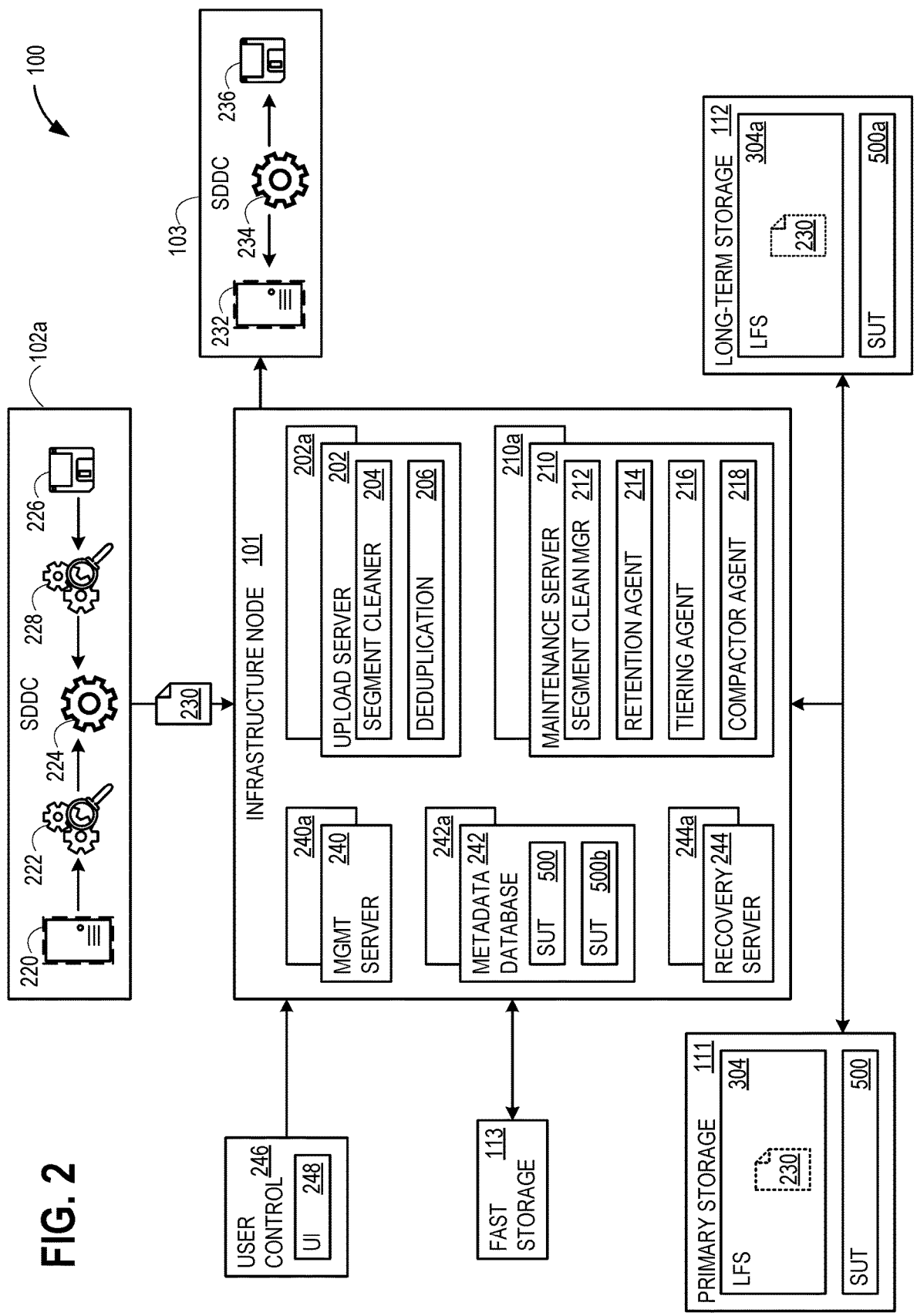
FIG. 2 illustrates additional details for the architecture of FIG. 1.
Figure 3:
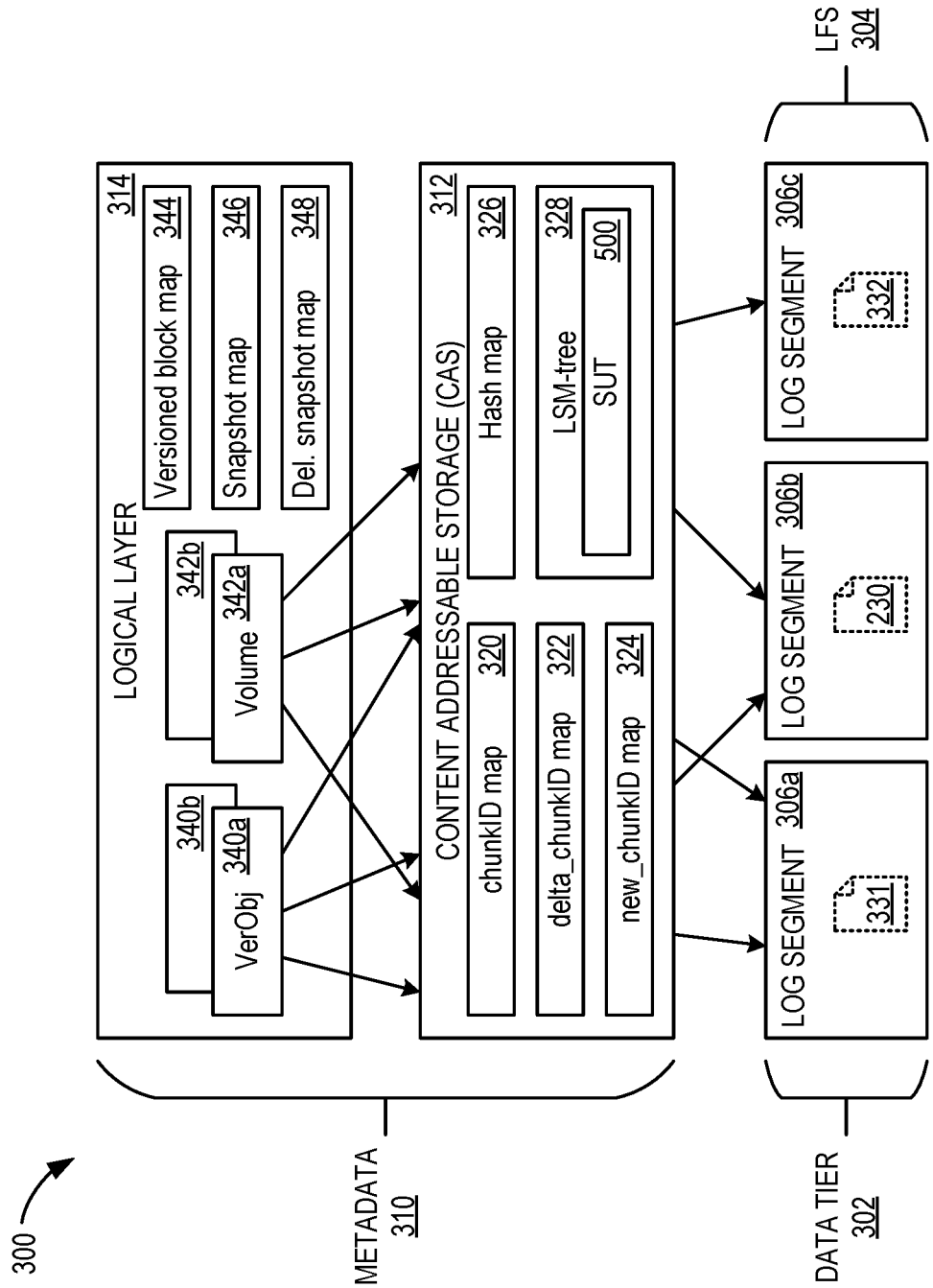
FIG. 3 illustrates additional details for a tiered data storage structure used in the architecture of FIG. 1.

FIG. 1 illustrates an architecture 100 that can advantageously support managing archived storage, for example storage of versioned objects. A first node, infrastructure node 101, receives snapshots from a second node 102a and stores the snapshots in a primary storage 111 using a tiered data structure (a tiered structure 300). Tiered structure 300 is illustrated in FIGS. 2 and 3, and described in further detail in relation to FIG. 3. In some examples, the snapshots include versioned object data, for example VMDK snapshots and snapshots of virtual storage area network (SAN) distributed file system (VDFS) volumes. In some examples, node 102a comprises an SDDC. Although infrastructure node 101 is illustrated as a single node, separate from primary storage 111, this is a notional illustration and the operations described for infrastructure node 101 may be dispersed among multiple physical locations, including at least some executing on a common apparatus with at least a portion of primary storage 111. In some examples, at least a portion of infrastructure node 101 may be implemented using resources that are local to a user (e.g., on-premises computing assets).

Some snapshots may be sent to a third node 103, which uses the snapshots for workload recovery in fast fail-over operations. Infrastructure node 101 also receives snapshots from a fourth node 102b, which may be another SDDC that uses node 103 for fail-over. As shown, infrastructure node 101 further receives snapshots from a user device 102c, which may be a mobile user device (e.g., a smartphone or tablet) under the control of a mobile device management (MDM) system that leverages infrastructure node 101 for backup and restoration options. In addition to using primary storage 111, infrastructure node 101 also uses a long-term storage 112 and fast storage 113. For example, if a snapshot stored in primary storage 111 has not been accessed for a threshold length of time, indicating that it may not be accessed often in the future, it may be moved to long-term storage 112 which provides a more cost-effective (less expensive) storage option. Further, infrastructure node 101 uses fast storage 113 for short-term or speed-critical data storage, for example during intake operations of snapshots and maintenance operations, such as segment cleaning and deduplication. In some examples, a single storage node (e.g., any of primary storage 111, long-term storage 112, and fast storage 113) may include a different number of physical storage components.

FIG. 2 illustrates additional details for architecture 100. Additional details of components and data representations are shown in FIGS. 3-5B, and operations associated with architecture 100 are illustrated in flow charts of FIGS. 6-9. In some examples, various components of architecture 100 (e.g., infrastructure node 101, nodes 102a, 102b, and 103, user device 102c, primary storage 111, long-term storage 112, and fast storage 113) are implemented using one or more computing devices 1000 of FIG. 10. As described herein, examples of architecture 100 provide advantageous operation, including that backend storage is compatible with commercial storage application programming interfaces (APIs), reading and writing operations implemented to minimize cost, low latency for frequently-accessed data, lower storage cost for infrequently-accessed data (e.g., tiering), low write amplification, compression, deduplication, network acceleration, and encryption. The result is that architecture 100 is able to efficiently archive versioned objects.

Node 102a is illustrated as having a versioned object 220, an object differencer 222, an upload agent 224, a file volume 226, and a file differencer 228. Versioned object 220 may comprise, for example, a VMDK. In some examples, there may be multiple versioned objects 220, and each may have a 48-bit identifier. Object differencer 222 determines block-level differences in subsequent versions (at the time of a snapshot) of versioned object 220. File volume 226 may comprise, for example, a VDFS volume. In some examples, there may be multiple file volumes 226, and each may have a 48-bit identifier. File differencer 228 determines block-level differences in subsequent versions (at the time of a snapshot) of file volume 226.

The data of versioned object 220 and file volume 226 includes chunks. In some examples, each chunk is 4 kilobytes (KB) so that block differences are 4 KB aligned. File level differences may be aligned to byte boundaries, and the chunks for file volume 226 may be of variable size on byte boundaries. A chunk (or an array of chunks) is a deduplication unit, allowing multiple versioned objects 220 or multiple file volumes 226 to point to common chunks to save space. In some examples, VDFS supports snapshots natively and stores file level differences, leveraging a flexible storage backend and using a versioned object format as its metadata backend. In some examples, write-ahead logs are disabled for VDFS, and VDFS metadata uses a 512-byte block size to reduce the metadata write amplification. In some examples, VDFS file format indicates a list of chunk identifiers (chunkIDs) to directly point to chunks in a CAS 312 (see FIG. 3). In some examples, VDFS uses variable size byte-boundary chunking so that each chunk is on average 80 KB for enhanced deduplication space saving.

Upload agent 224 intakes differences from object differencer 222 and file differencer 228, and compiles a series of snapshots 230. In some examples, snapshot 230 has a 48-bit identifier (snapID). In some examples, node 102a has multiple upload agents 224 for scalability. Since multiple nodes (e.g., nodes 102a, 102b, and 102c) may each have at least one upload agent 224, in some examples, a unique identifier is assigned to each upload agent 224. In some examples, upload agent 224 sends snapshot 230 (data and metadata) to an upload server 202 at infrastructure node 101. In some examples, to reduce the burden on upload server 202, upload agent 224 sends snapshot 230 directly to primary storage 111, bypassing upload server 202, and sends only metadata regarding to snapshot 230 to upload server 202. In some examples, upload agent 224 calculates hash values for blocks of snapshots 230, and sends the hash values to upload server 202. In some examples, infrastructure node 101 has multiple upload servers (e.g., upload server 202 and upload server 202a) to communicate with an upload agent 224 at each of different nodes 102a, 102b, and 102c.

A deduplication agent 206 in upload server 202 compares the received hash values to hashes already within a hash map 326 within CAS 312 (see FIG. 3) to identify duplicates. Upload server 202 identifies the unique hash values to upload agent 224, and upload agent 224 sends only the blocks of snapshot 230 that correspond to the unique blocks. Upload server 202 adds the unique hash values (of the sent blocks of snapshot 230) to hash map 326. In this manner, infrastructure node 101 performs deduplication of snapshot 230 using at least CAS 312. Network acceleration is achieved by this deduplication, which potentially reduces demand on network bandwidth.

In some examples, upload server 202 also comprises a segment cleaner 204, which cleans a SUT 500 (see FIGS. 3 and 5A) that is used to manage storage of snapshot 230 and other snapshots. Segment cleaning operations are depicted in, and described in relation to, FIG. 8. In some examples, segment cleaner 204 is a part of a maintenance server 210, or is located elsewhere. Maintenance server 210 includes a segment cleaner manager 212, a retention agent 214, a tiering agent 216, and a compactor agent 218. Segment cleaner manager 212 optimizes segment cleaning by balancing the cost of cleaning operations (reads/writes) with the cost of expected recovered storage, as is described in relation to FIG. 8. Retention agent 214 determines whether and when snapshot 230 will be deleted. Tiering agent 216 determines whether and when snapshot 230 will be moved from primary storage 111 to long-term storage 112. In some examples, retention agent 214 and tiering agent 216 are combined, and retention decisions include both whether snapshot 230 will be kept, and if so, whether it will be in primary storage 111 or long-term storage 112. Compactor agent 218 manages compaction activities, such as compaction of LSM-tree 328 (see FIG. 3). In some examples, infrastructure node 101 has multiple maintenance servers (e.g., maintenance server 210 and maintenance server 210a), with each handling different ones of nodes 102a-102c.

A management server 240 implements user-controllable options and configurations provided by a user from a user control component 246 running a user interface 248. In some examples, multiple management servers (e.g., management server 240 and management server 240a) handle multiple users, independently. A recovery server 244 manages recovery operations at infrastructure node 101, for example file restoration operations, fail-over operations, and fail-back operations. Recovery server 244 works in conjunction with a recovery agent 234 on node 103. Recovery agent 234 leverages a metadata database 242 for disaster recovery. For example, recovery agent 234 restores versioned object 220 from node 102a as versioned object 232 on node 103, and file volume 226 as file volume 236 by reading metadata database 242 and pulling needed data (e.g., snapshot 230) from primary storage 111 or long-term storage 112. In some examples, versioned object 232 is a clone of versioned object 220, and file volume 236 is a clone of file volume 226. States are stored in metadata database 242, allowing upload server 202 to be stateless. In some examples, there are multiple recovery servers (e.g., recovery server 244 and recovery server 244a) and metadata databases (e.g., metadata database 242 and metadata database 242a) to handle different ones of nodes 102a-102c. Different components of infrastructure node 101 are able to scale and be replaced independently.

Infrastructure node 101 uses fast storage 113 for short-term or speed-critical data storage, for example during intake of snapshot 230 and/or metadata associated with snapshot 230, and maintenance operations, such as segment cleaning and deduplication. In some examples, fast storage comprises an elastic block store (EBS) of size 128 gigabyte (GB). As indicated, primary storage 111 stores snapshot 230 in a manifestation of LFS 304 of tiered structure 300 (see FIG. 3), and when snapshot 230 is moved to long-term storage 112, long-term storage 112 stores snapshot 230 in an LFS 304a. In some examples, LFS 304 on primary storage 111 uses 4 megabyte (MB) segments and LFS 304s on long-term storage 112 uses 40 MB segments. SUT 500, which may be stored in metadata database 242 on infrastructure node 101 or on primary storage 111, provides reference information for managing LFS 304. SUT 500a, which may be stored in metadata database 242 on infrastructure node 101 or on long-term storage 112, provides reference information for managing LFS 304a.

FIG. 3 illustrates additional detail for tiered structure 300, which comprises a data tier 302 and a metadata tier 310. Data tier 302 is a transaction log implemented as an LFS 304. Metadata tier 310 comprises a CAS 312 and a logical layer 314, giving tiered structure 300 three tiers. Some common commercial object storage solutions have unique properties relative to traditional storage, including no overwrite and input/output (I/O) transaction cost. Once an object is written, it can no longer be partially overwritten or appended. And in some scenarios, each read/write transaction is charged regardless of its size. The no-overwrite property pushes toward smaller objects to allow easy modification, whereas the transaction cost pushes toward larger objects to reduce the number of separate transactions. The present disclosure finds a balance that avoids overwriting data while storing small updates into larger objects.

A log is a data structure that may often meet both goals, by writing a series of large segments out in order. It avoids overwriting live old segments and its segment size may be selected to be sufficiently large (e.g., 4 MB) such that transaction costs are minimized. Thus, tiered structure 300 uses a log as its fundamental building block. Because metadata and data have different properties, they are managed using different log-based data structures. For example, bulk data is managed by a log-structured file system, LFS 304, whereas metadata tier 310 (more specifically, CAS 312) uses a log-structured merge-tree, LSM-tree 328, and contains indexing for data deduplication. Logical layer 314 represents versioned objects 340a and 340b, and volumes 342a and 342b, and their snapshots. In some examples, versioned objects 340a and 340b each include a 48-bit object identifier (objID), a list of snapshots, and block-level differences at 4 KB granularity. In some examples, an object name is <objID>-<sequenceID>, so that all blocks uploaded for the same object (VMDK) may be located easily. Each snapshot is a version of an object (or a volume), for example, snapshot 230 is a version of versioned object 340a.

In some examples, versioned object 340a and versioned object 340b represent different manifestations of versioned object 220, and volume 342a and volume 342b represent different manifestations of file volume 226. Versioned block map 344 holds logical block addresses (LBAs) that point to content in CAS 312. In general, metadata (e.g., metadata tier 310) is written to primary storage 111 and fast storage 113, recently and frequently-accessed snapshots (data) in data tier 302 is written to primary storage 111, and older infrequently-accessed data in data tier 302 is written to long-term storage 112.

In some examples, LFS 304 comprises a series of 4 MB objects, where each object forms a linear order by embedding a timestamp in a key of the object. Since multiple upload agents 224 upload to the same LFS 304 concurrently, a unique identifier (ID) may be assigned to each upload agent 224, and the key of each log segment (e.g., log segment 306a, log segment 306b, or log segment 306c) may be set to log/<timestamp>-<ID>/data, in some examples. The portion of the key string preceding "/data" is referred to as a prefix and, in some examples primary storage 111 may support several thousand I/O transactions per second for each object with a different prefix. By providing different log segments with different prefixes, LFS 304 may be randomly read with enhanced speed. In some examples, it is possible to range scan the log segments based on keys by using a start-after argument of a ListObjects command. This allows log segments to be efficiently scanned in order when needed. For example, as illustrated, log segment 306a holds a snapshot 331, log segment 306b holds snapshot 230, and log segment 306c holds snapshot 332. Snapshot 230 may thus be readily located in data tier 302.

Figures 5A, 5B:
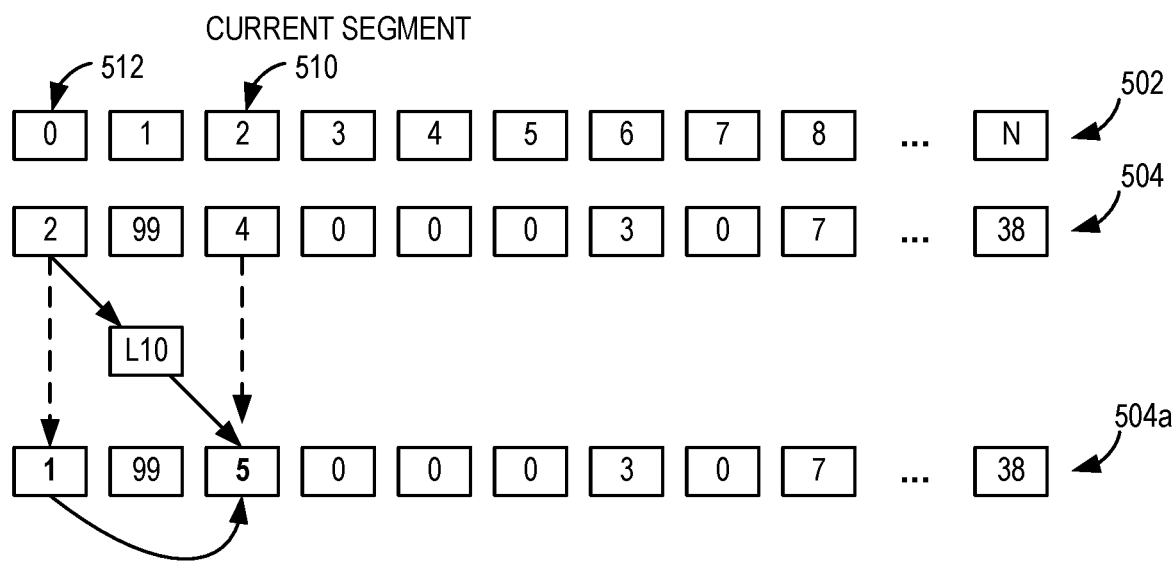
FIGS. 5A and 5B illustrate further details for a segment usage table (SUT), as may be used with the tiered structure of FIG. 3.

LFS 304 is managed, in part, by SUT 500, which is descried in further detail in relation to FIG. 5A. In some examples, SUT 500 has one integer per segment indicating the number of live blocks. In some examples, SUT 500 also indicates the total number of blocks in each segment. In some examples, SUT 500 is stored in LSM-tree 328 as key-value pairs. SUT 500 summarizes the amount of live space left in each log segment (e.g., log segments 306a-306c) and may be used to ascertain which log segments are suitable candidates for segment cleaning (garbage collection). After segments are selected as candidates, they are read into memory, and each block is checked to determine whether CAS 312 still points to its log segment. If so, those blocks are live blocks, and are rewritten to the end of LFS 304 as new segments. CAS 312 is adjusted to point to the new log segments and the old segments may be removed. Removal may be logical, such as dereferencing the segments although, in some examples, physical removal of the actual data does not occur until the media is over-written with new data. Segment cleaning is also useful to support tiering, the movement of older infrequently-accessed data from faster, more expensive storage (e.g., primary storage 11) to less expensive storage (e.g., long-term storage 112). In some examples, versioned objects 340a and 340b, and volumes 342a and 342b are scanned to identify which of their blocks are not referenced by snapshots newer than some threshold time period (e.g., 6 months). Those blocks are then moved to long-term storage 112. Segment cleaning is described in further detail in relation to FIG. 8.

LSM-tree 328 comprises a write-optimized data structure that maintains multiple levels of larger sorted tables, for example 300 Mb, 3 GB, 30 GB, and 300 GB as an exponential four-level LSM-tree. LSM-tree 328 may be structured to minimize write amplification for random updates, and each level may be a log. CAS 312 sitting between logical layer 314 and LFS 304 (in data tier 302) serves multiple purposes simultaneously. This arrangement permits deduplication operations to locate data by content, and adds a level of indirection to allow LFS 304 to move data efficiently during segment cleaning. A hash function (e.g., secure hash algorithm 256 (SHA-256)) may be used as the content hash so that any blocks with identical hash values stored in a hash map 326 may be identified as duplicates. This also enables CAS 312 to locate any block in LFS 304 when provided its hash value, facilitating data deduplication. Data deduplication may be performed inline and/or offline. Inline deduplication performs deduplication on the write path directly so that less data is written initially, thereby implementing network acceleration.

However, because hash values are randomly distributed, CAS 312 also includes a chunkID map 320 to improve caching. In some examples, chunkIDs in chunkID map 320 are sequentially allocated for locality and are stored together in LSM-tree 328. In some examples, a chunkID may be 8-bytes, separated into two address spaces, identified by the highest bit: <isMetadata(1), id(63)>. When storing VDFS metadata, the logical variable isMetadata is true. Such chunkIDs are unique and can be over-writeable. Variable size chunking with a content-based chunk boundary may be used to chunk files into variable size chunks, and CAS 312 may store variable size chunks in the same way as other block-based content. In some examples, the average size of a chunk is 80 KB, which not only reduces the average size of both metadata compared to 4 KB block-level differences, but permitting variable chunk size may also enhance deduplication efficiency in comparison with fixed-size block-level differences.

When logical layer 314 points to CAS 312, it points to chunkID rather than hash values. This may reduce segment cleaning overhead since searching chunkIDs in a segment, to identify live chunks, may be faster due to the chunkIDs having contiguous values. Using chunkIDs as the referencing value allows merging adjacent tuples, in some examples, to reduce the size of chunkID map 320. This is because, in some examples, chunkIDs include an identifier of the upload server which manages the chunks identified by the chunkIDs (e.g., upload server 202 or upload server 202a). This prevents the need for upload server 202 and upload server 202a to deconflict assigning contiguous numerical ranges for chunkIDs. In some examples, if a set of chunks does not have at least a threshold number of contiguous blocks (e.g., 32 blocks of 4 KB, providing a 128 KB sized set), the set is not represented in hash map 326. This reduces the size of hash map 326, and results in a deduplication unit size of at least 128 KB.

Referring now to specific data content and organization within tiered structure 300, logical layer 314 holds versioned block map 344, a snapshot map 346, and a deleted snapshot map 348. CAS 312 holds chunkID map 320, a delta_chunkID map 322, a new_chunkID map 324, hash map 326, and SUT 500 in LSM-tree 328. LFS 304 comprises multiple log segments 306a-306c that, in some examples, are each approximately 4 MB when stored on primary storage 111 and approximately 40 MB when stored on long-term storage 112. For example, log segment 306a may have 4 MB of data followed by a variable size metadata portion describing the data. In some examples, the key of the log segment (segID) is set to log/<timestamp>-<id>/data and the segment index (see FIG. 5A) is at least a portion of the log prefix. In some examples, each log segment has a different prefix. For example, sample log object names may be log-0000000001/data, log-0000000002/data. Data remains in a particular segment forever until the live data in the segment drops below a threshold, triggering cleaning, so that the cost of moving the live data to a new segment is less expensive than retaining the original segment with the dead data.

Versioned block map 344 maps a logical block number of a snapshot to CAS 312. In some examples, it takes the format <objID, snapID, LBA>-><chunkID, numBlks>, where numBlks is the number of blocks in a chunk identified by chunkID. With this schema, locating the tuple of the given LBA having the largest snapID value is relatively efficient, because it requires only performing a lookup for objID, LBA, maximum(snapID). Snapshot map 346 lists all snapshots of a block device. Deleted snapshot map 348 lists all snapshots being deleted (see FIG. 7).

CAS 312 holds chunkID map 320 which maps chunkIDs to their location in LFS 304. In some examples, it takes the format <chunkID>-><segID, numBlks>. Changes to chunkIDs due to a new file difference are stored in delta_chunkID map 322, which enables blind writing to CAS 312. New uploaded chunkIDs are stored in new_chunkID map 324 before they are merged into chunkID map 320. In some examples, hash map 326 takes the format <hash value>-><chunkID>, and some examples use cuckoo hashing. In some examples, metadata tier 310 stores at least some of the above-described components in a metadata LFS to record reordering of blocks during segment cleaning. Storing chunkID map 320 in a metadata LFS enables it to be compressed. By replaying the metadata LFS, metadata may be rebuilt, which may be beneficial for recovery of lost metadata or a change in metadata design or formatting.

Figure 4A:
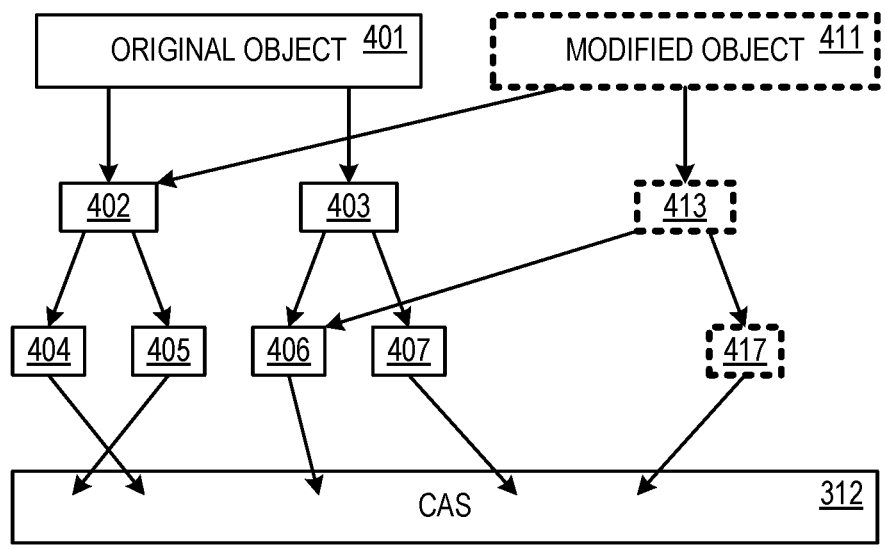
FIGS. 4A and 4B illustrate further details for content addressing, as may be used in the tiered structure of FIG. 3.

FIG. 4A illustrates breaking up an object into chunks. An original object 401 is separated into portion 402 and portion 403. Portion 402 is further separated into portion 404 and portion 405, and portion 403 is further separated into portion 406 and portion 407. Portions 404-407 may each be chunks or sets of chunks. At a later time, original object 401 is changed into modified object 411. When generating a snapshot, the difference between original object 401 and modified object 411 is stored, rather than the entirety of modified object 411. As illustrated, modified object 411 is separated into portion 402 (unchanged, and thus common with original object 401) and portion 413. Portion 413 is further separated into portion 406 (unchanged, and thus common with original object 401) and portion 417. Portion 417 may be a chunk or a set of chunks. Thus, for the later snapshot, only portion 417 requires storage, and modified object 411 may be restored using portions 404-406 and 417.

Figure 4B:
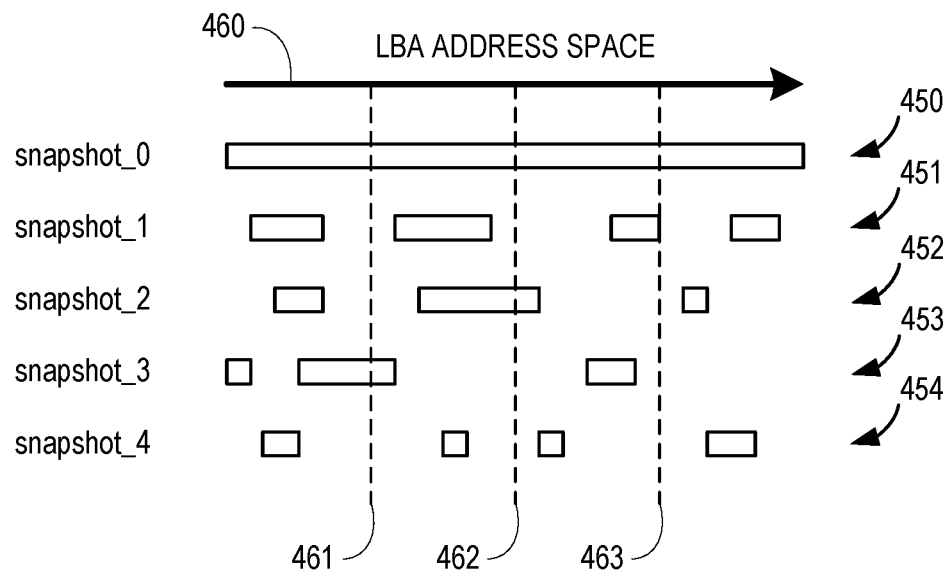

This is illustrated graphically in FIG. 4B, in which snapshot data portions 450-454 are shown relative to an LBA address space 460 for each of five snapshots. A first snapshot, snapshot_0 holds the entirety of a versioned object, shown as a complete data portion 450. Later, a second snapshot, snapshot_1 has only a set of differences in data portion 451. This arrangement is repeated for a third snapshot, snapshot_2 having another set of differences in data portion 452, a fourth snapshot, snapshot_3 having another set of differences in data portion 453, and a fifth snapshot, snapshot_4 having yet another set of differences in data portion 454. A set of segment boundaries, segment boundary 461, segment boundary 462, and segment boundary 463 indicate that LBA address space 460 spans four segments, in this notional example.

FIG. 5 illustrates additional detail for SUT 500. As illustrated, SUT 500 comprises key-value pairs: a segment index 502 and a live block count 504. In some examples, SUT 500 also indicates a total number of blocks (live and dead) in each segment. In some examples, an index of segment index 502, illustrated notionally as 1, 2, . . . N takes the format <timestamp>-<uploader_ID>, where uploader_ID is a unique identifier of the upload agent 224 that uploaded the data, and timestamp is a time stamp of when the data was received by infrastructure node 101. This permits the use of multiple upload agents 224 without conflict. In some examples, segment index 502 comprises at least a portion of a log prefix.

SUT 500 is used to track the space usage of each segment in a storage arrangement, such as LFS 304, so that segment cleaning candidates may be identified by their live block count 504. As writing progresses, the current segment (to which the next incoming data will be written) circles around. Segment cleaning operations (see FIG. 7) clean out lightly used segments and coalesce their blocks into full or more heavily-used segments. If live block count 504 is zero, indicating that a segment contains no live data, that segment may be over-written without moving any blocks. Any prior-written data in that segment has either already been moved or marked as deleted and thus may be over-written without loss of data.

FIG. 5B illustrates an example of moving a block with its LBA indicated as L10 from its original segment 512 (indicated as having a segment index value of 0) to a current segment 510. The live block count 504 value in original segment 512 had been 2, but is decremented to 1, and the live block count 504 value in new segment 510 had been 4, but is incremented to 5.

Figure 6:
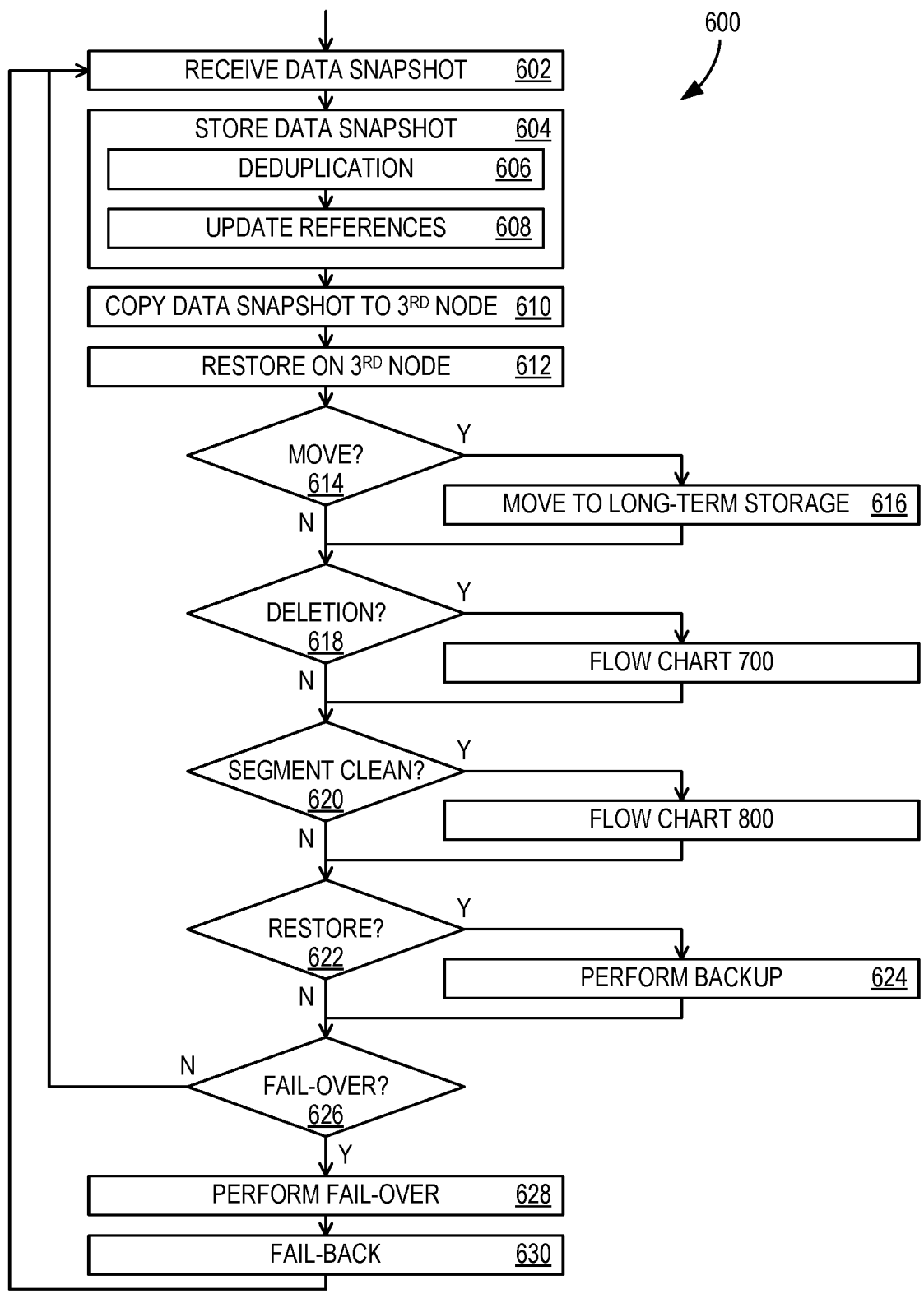
FIG. 6 illustrates a flow chart of exemplary operations associated with the architecture of FIG. 1.

FIG. 6 illustrates a flow chart 600 of exemplary operations associated with architecture 100 managing archived storage. In some examples, the operations of flow chart 600 are performed by one or more computing devices 1000 of FIG. 10. Operation 602 includes receiving, at infrastructure node 101, from upload agent 224 at node 102a, snapshot 230 comprising object data. In some examples, node 102a comprises an SDDC. In some examples, snapshot 230 comprises a versioned object difference. In some examples, operation 602 includes upload agent 224 collecting block differences and calculating their hash values, upload server 202 determining which hash values cannot be found within hash map 326 (new hash values), and upload agent 224 transmitting only difference portions corresponding to new hash values to upload server 202. In some examples, upload agent 224 encrypts the difference portions for transmitting.

Operation 604 includes storing snapshot 230 in primary storage 111 in tiered structure 300, and is comprised of operations 606 and 608. Operation 606 includes performing deduplication of snapshot 230 using at least CAS 312. In some examples, deduplication uses a unit size of at least 128 KB. Metadata references are updated in operation 608. Tiered structure 300 comprises data tier 302 and metadata tier 310. Data tier 302 comprises LFS 304 for storing snapshot 230. Metadata tier 310 comprises a CAS 312 identifying addresses within LFS 304, and metadata tier 310 further comprises logical layer 314 indicating content in CAS 312. CAS 312 comprises an LSM-tree.

Operation 610 includes copying snapshot 230 to node 103 where it is restored with recovery agent 234 at 612. Thus, operation 612 includes restoring an object (e.g., versioned object 220 and/or file volume 226) on node 103. A decision operation 614 determines whether to move snapshot 230 to long-term storage 112. In general, both a schedule for moving a snapshot to long-term storage 112 and a schedule to delete a snapshot may be termed a retention schedule, because either decision regards whether to retain the snapshot on primary storage 111. If snapshot 230 is to be moved, this occurs as part of operation 616, which includes, based at least on a retention schedule, moving at least a portion of snapshot 230 from primary storage 111 to long-term storage 112. A decision operation 618 determines whether to delete snapshot 230 from either primary storage 111 or long-term storage 112. If snapshot 230 is to be deleted, this occurs using flow chart 700 of FIG. 7. Flow chart 700 operates to, based at least on a retention schedule, delete at least a portion of snapshot 230. In some examples, the retention schedule is linear, for example retaining the most recent 64 snapshots (or some other selected number). In some examples, the retention schedule is non-linear, for example, saving a snapshot every 30 minutes, retaining 7 from the prior 24 hours, 13 from the prior week, 12 (monthly) from the prior year, and 6 annually.

Deleting a snapshot may remove blocks in some segments, and may be a trigger for segment cleaning. Other segment cleaning triggers are based on a schedule or other events. A decision operation 620 determines whether to launch segment cleaning as flow chart 800 of FIG. 8. In some passes through flow chart 600, entering flow chart 800 from decision operation 620 includes, based at least on deleting the data segment, performing a segment cleaning operation. Flow chart 800 operates to perform segment cleaning of data tier 302 using SUT 500.

A decision operation 622 determines whether any objects on node 102a require restoration. This is a different determination than restoration on node 103. Restoration on node 103 permits failover so that node 103 can act as an SDDC for users when node 102a becomes unavailable. Restoration on node 102a, performed in operation 624, is for the purposes of restoring objects on node 102a to a condition in which they had been prior to a problem (e.g., corruption or accidental deletion). That is, operation 624 performs a backup using at least stored snapshot 230, thereby restoring node 102a to a pre-problem condition (rather than permitting node 103 to be substituted for node 102a, as would occur during a failover).

A decision operation 626 determines whether to perform a failover from node 102a to node 103, such as if node 102a ceases operation for some reason (e.g., maintenance or a crash). If so, operation 628 includes performing a fail-over operation from node 102a to node 103 using at least stored snapshot 230 for workload recovery. When node 102a is restored and is functioning acceptably, operation 630 includes performing a failback operation from node 103 back to node 102a. In some examples, only differences of versioned object 232 and file volume 236 that arose during fail-over operation using node 103 need to be captured and moved to node 102a. This differencing and moving may occur during operation 630.

Figure 7:
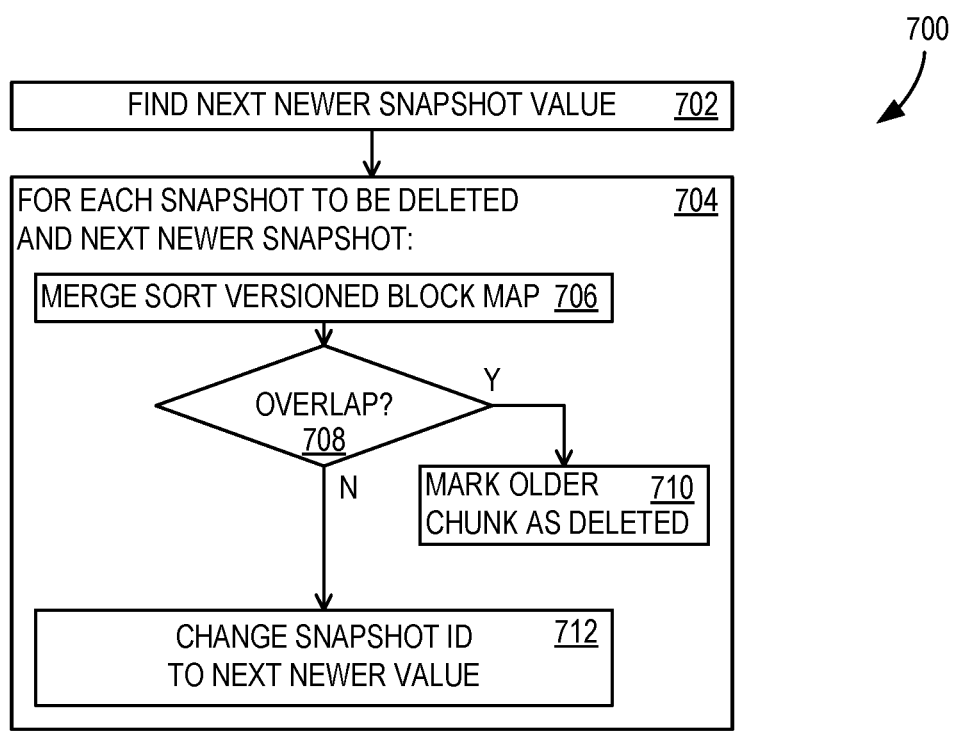
FIG. 7 illustrates a flow chart of additional exemplary operations that may be used in conjunction with the flow chart of FIG. 6.

FIG. 7 illustrates a flow chart 700 of exemplary operations involved with deleting a snapshot, for example snapshot 230, using retention agent 214. The penultimate snapshot (second from newest or next newer) for an object is selected in operation 702. For example, if there are five snapshots, the fourth snapshot is selected. Operation 704 includes operations 706-712 and is performed for each snapshot to be deleted (e.g., the first three snapshots in this example), plus the penultimate snapshot selected in operation 702. For each snapshot, the versioned block map 344 is merge sorted in operation 706, and decision operation 708 determines whether there is range overlap in the chunks that constitute the snapshots (e.g., the four snapshots in this example). If so, operation 710 marks the chunkIDs of older chunks, for the snapshots prior to the penultimate snapshot selected in operation 702, as deleted. This way, only the latest overlap range remains. Otherwise, operation 712 changes the snapID to that of the penultimate snapshot. At this point, in some scenarios, chunkID map 320 may still reference unused chunks.

The following pseudocode provides an example implementation of flow chart 800:

```
def HandleSnapshotDeletion
    find the next newer snapshot;
    for each snapshot to be deleted and the next newer snapshot:
        merge sort their versioned block maps;
        // is there overlap?
        if range overlap:
            mark the older chunkIDs as deleted;
            // only the latest overlap range stays
        if not overlapped:
            change snapID of the range to the next newer snapshot;
```

Figure 8:
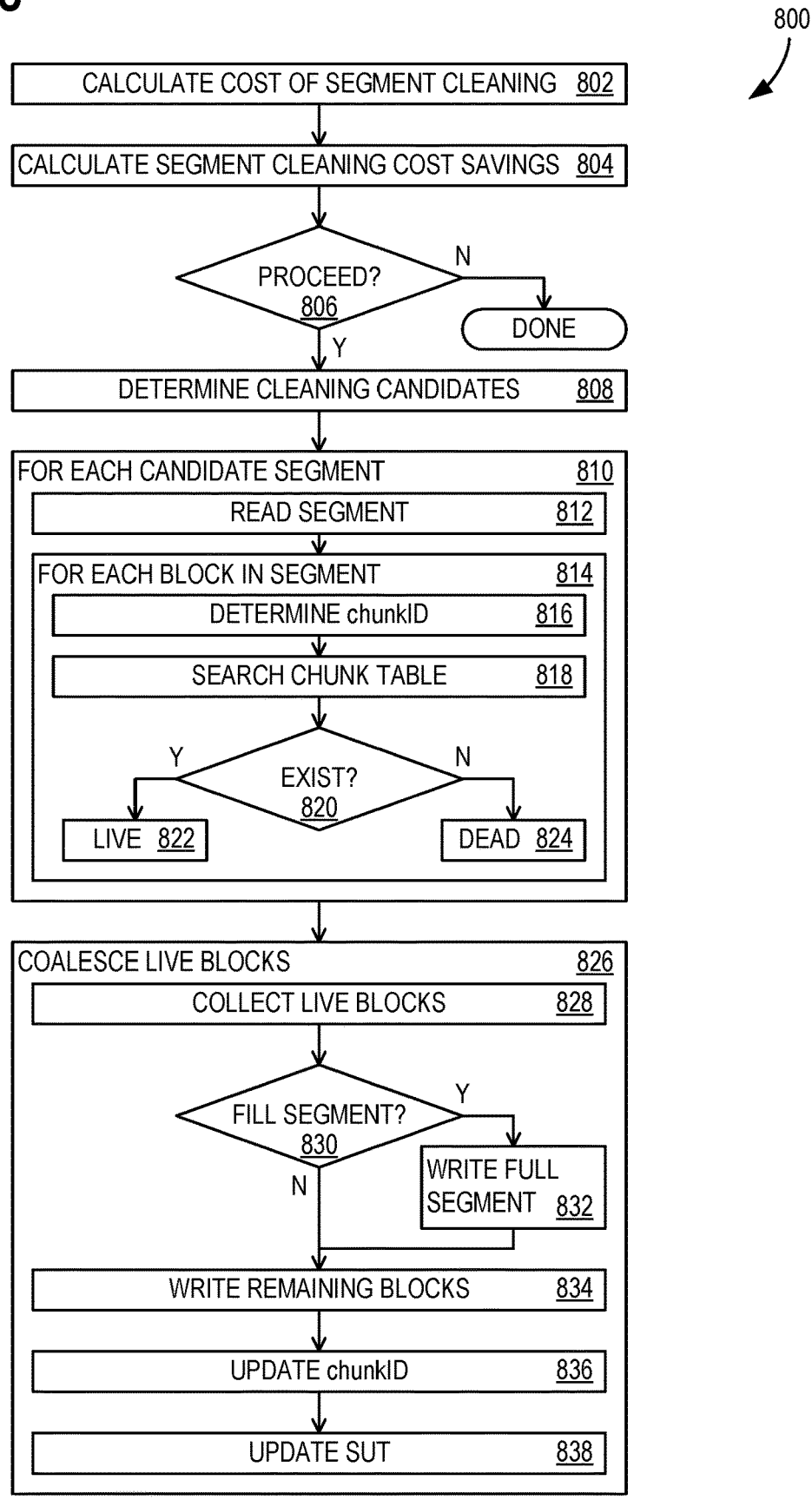
FIG. 8 illustrates another flow chart of additional exemplary operations that may be used in conjunction with the flow chart of FIG. 6.

FIG. 8 illustrates a flow chart 800 of exemplary operations involved with cleaning a segment usage table, for example cleaning SUT 500 using segment cleaner 204 and segment cleaner manager 212. In some examples, the operations of flow chart 800 are performed by one or more computing devices 1000 of FIG. 10. In some examples, segment cleaner 204 performs segment cleaning on a daily or weekly schedule, freeing segments to save storage costs. In operations 802 and 804, segment cleaner manager 212 determines how often it is cost-effective to perform segment cleaning, balancing the I/O transaction costs with cost savings of reduced storage. Operation 802 includes, based at least on access costs, calculating an expected cost of a segment cleaning operation. Operation 804 includes, based at least on storage costs, calculating an expected cost savings from the segment cleaning. In some examples, segment cleaner manager 212 may have an artificial intelligence (AI) or machine learning (ML) component to perform these calculations, and may use historical data as a basis for estimates in the calculations.

A decision operation 806 determines whether to delay or proceed with segment cleaning, for example, based at least on the expected cost of the segment cleaning and the expected cost savings from the segment cleaning, determining whether to perform the segment cleaning. If segment cleaning is to occur, operations 808-838 include, based at least on making a determination to perform the segment cleaning, performing the segment cleaning. Operation 808 includes determining cleaning candidates (e.g., suitable candidates for segment cleaning) in SUT 500. In some examples, a threshold of 30% or 50% live blocks may be used, with a lower percentage generally making a segment a better cleaning candidate. In some examples, segment cleaner 204 includes an AI or ML component that selects the cleaning candidate criteria. Thus, the segment cleaning comprises determining, based at least on numbers (e.g., quantities) of live blocks indicated in SUT 500, a plurality of segment cleaning candidates.

The cleaning itself is a multi-stage process of updating chunkID map 320 and then updating SUT 500 after coalescing live blocks. Operation 810 includes operations 812-824, which are performed for each segment cleaning candidate of the plurality of segment cleaning candidates. The candidate segment is read in operation 812, and operation 814 includes operations 816-824 that are performed for each block in the candidate segment. Thus, operation 814 forms a nested loop within operation 810. Operation 816 includes determining the chunkID, and chunkID map 320 is searched in operation 818 to ascertain where each chunk points to each segment. In some scenarios, the chunkID may no longer exist, or may not point to the same segment. Decision operation 820 includes determining whether the chunkID still exists and points to the same segment. If so, at operation 822, the block is marked as live, otherwise operation 824 includes, based at least on the block not being live, marking the block as free (e.g., dead).

Operation 826 comprises operations 828-838 and carries out a coalescing operation to coalesce live blocks from segment cleaning candidates to a new segment indicated as free in SUT 500. That is, operation 826 includes, based at least on the block being live, including the block in a coalescing operation. Operation 828 includes collecting the live blocks identified in operation 822, and decision operation 830 determines whether there is a sufficient number of live blocks to fill an entire segment. In general, when a block is being written, write amplification occurs. When writing only full segments, write amplification (e.g., due to a read-modify-write penalty) may be reduced, increasing efficiency and speed. If there exists a sufficient number of live blocks, operation 832 writes them to a new segment, for example, at the current end of the log of LFS 304. Operation 834 includes writing leftover live blocks to a new segment. Operation 836 updates chunkID map 320 to de-reference deleted snapshot chunks. For now, the data itself may remain in LFS 304, and the blocks holding those dereferenced chunks may still be indicated as live in SUT 500. SUT 500 is updated to incorporate changes to chunkID map 320 in operation 838. This deletes the candidate segment, although the data may remain on the physical media until it is over-written (e.g., because it is marked as free in SUT 500).

The following pseudocode provides an example implementation of flow chart 800:

```
def SegCleaning:
    search SUT to find good candidate segments;
    // old segments with a relatively small number of live blocks
    for each candidate segment:
        read the candidate segment;
        for each block in the candidate segment:
            determine the chunkID;
            search chunk table (where each chunk points to each segment);
                // chunk table might not exist anymore or might not point
                to that segment
            if chunkID still exists and points to same segment (segment index):
                mark block as live;
            else:
                mark block as dead;
        collect live blocks;
        if enough live blocks to fill a segment:
            write live blocks into a new segment;
    write leftover live blocks into a new segment;
    update all affected chunkIDs in chunkID map to point to new segment;
    delete candidate segment (update SUT);
```

Figure 9:
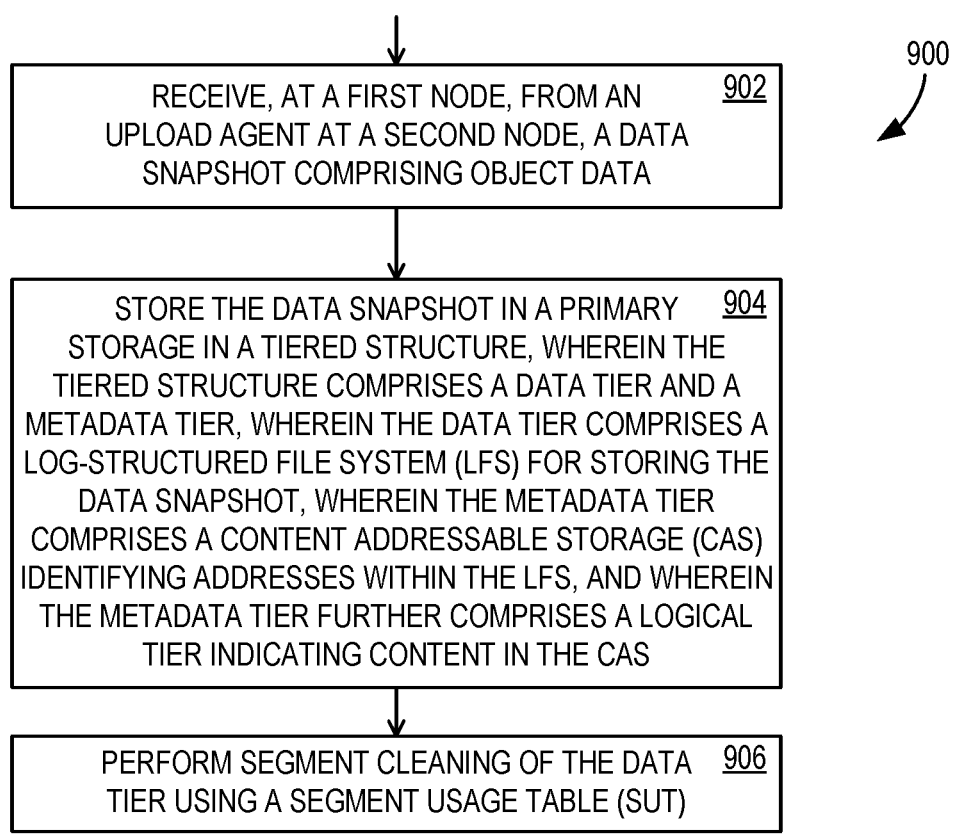
FIG. 9 illustrates another flow chart of exemplary operations associated with the architecture of FIG. 1.

FIG. 9 illustrates a flow chart 900 showing a method of managing archived storage. In some examples, the operations of flow chart 900 are performed by one or more computing devices 1000 of FIG. 10. Operation 902 includes receiving, at a first node, from an upload agent at a second node, a snapshot comprising object data. Operation 904 includes storing the snapshot in a primary storage in a tiered structure, wherein the tiered structure comprises a data tier and a metadata tier, wherein the data tier comprises an LFS for storing the snapshot, wherein the metadata tier comprises a CAS identifying addresses within the LFS, and wherein the metadata tier further comprises a logical layer indicating content in the CAS. Operation 906 includes performing segment cleaning of the data tier using a SUT.

Figure 10:
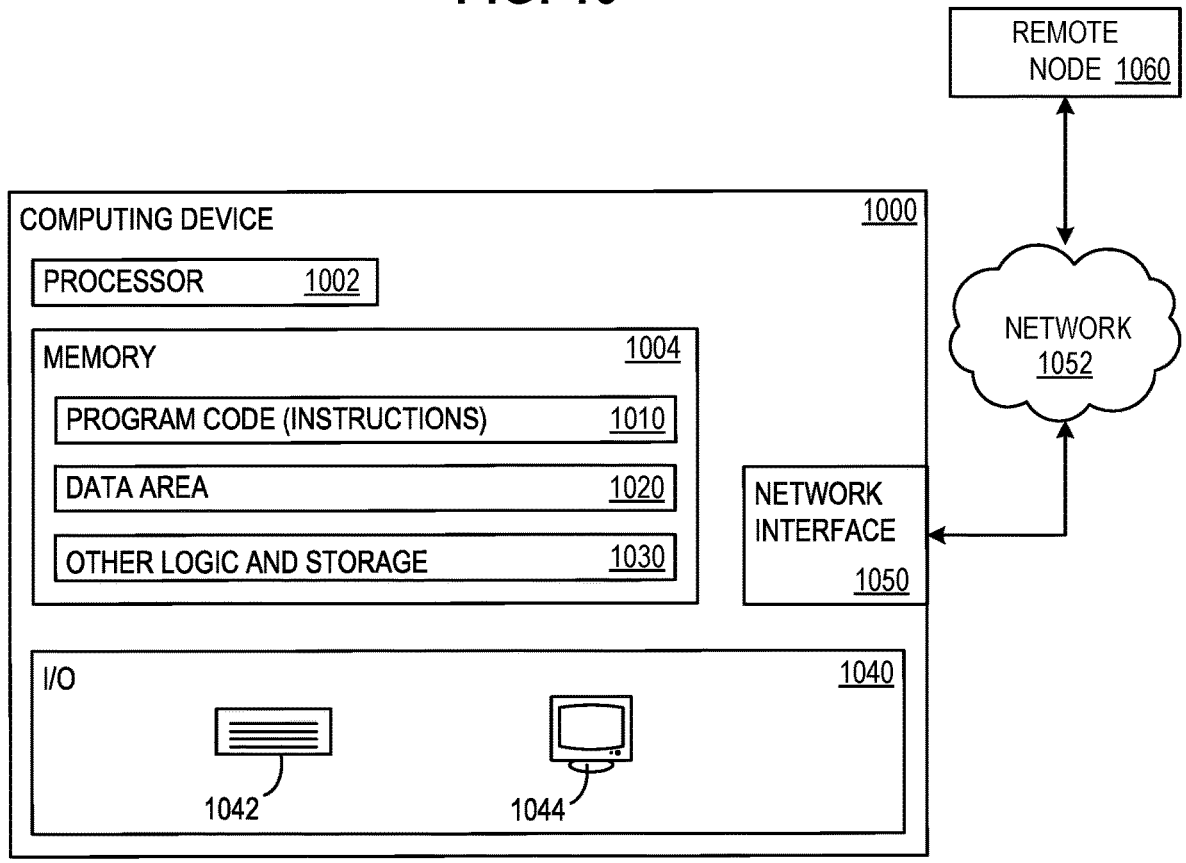
FIG. 10 illustrates a block diagram of a computing device that may be used as a component of the architecture of FIG. 1, according to an example embodiment.

FIG. 10 illustrates a block diagram of computing device 1000 that may be used within architecture 100 of FIG. 1. Computing device 1000 has at least a processor 1002 and a memory 1004 (or memory area) that holds program code 1010, data area 1020, and other logic and storage 1030. Memory 1004 is any device allowing information, such as computer executable instructions and/or other data, to be stored and retrieved. For example, memory 1004 may include one or more random access memory (RAM) modules, flash memory modules, hard disks, solid state drives (SSDs), non-volatile memory express (NVMe) devices, persistent memory (PMEM), quad-level cell (QLC) storage solutions, and/or optical disks. Program code 1010 comprises computer executable instructions and computer executable components that embody methods and operations disclosed herein. Other logic and storage 1030 that performs or facilitates other functions disclosed herein or otherwise required of computing device 1000. A keyboard 1042 and a computer monitor 1044 are illustrated as exemplary portions of an I/O component 1040, which may also or instead include a touchscreen, mouse, trackpad, and/or other I/O devices. A network interface 1050 permits communication over a network 1052 with a remote node 1060, which may represent another implementation of computing device 1000 or a cloud service.

Computing device 1000 generally represents any device executing instructions (e.g., as application programs, operating system functionality, or both) to implement the operations and functionality described herein. Computing device 1000 may include any portable or non-portable device including a mobile telephone, laptop, tablet, computing pad, netbook, gaming device, portable medium player, desktop personal computer, kiosk, embedded device, and/or tabletop device. Additionally, computing device 1000 may represent a group of processing units or other computing devices, such as in a cloud computing system or service. Processor 1002 may include any quantity of processing units and may be programmed to execute any components of program code 1010 comprising computer executable instructions for implementing aspects of the disclosure. In some embodiments, processor 1002 is programmed to execute instructions such as those illustrated in the figures.

Additional Examples

An exemplary computer system managing archived storage comprises: a processor; and a non-transitory computer readable medium having stored thereon program code for transferring data to another computer system, the program code causing the processor to: receive, at a first node, from an upload agent at a second node, a snapshot comprising object data; store the snapshot in a primary storage in a tiered structure, wherein the tiered structure comprises a data tier and a metadata tier, wherein the data tier comprises an LFS for storing the snapshot, wherein the metadata tier comprises a CAS identifying addresses within the LFS, and wherein the metadata tier further comprises a logical layer indicating content in the CAS; and perform segment cleaning of the data tier using a SUT.

An exemplary method of managing archived storage comprises: receiving, at a first node, from an upload agent at a second node, a snapshot comprising object data; storing the snapshot in a primary storage in a tiered structure, wherein the tiered structure comprises a data tier and a metadata tier, wherein the data tier comprises an LFS for storing the snapshot, wherein the metadata tier comprises a CAS identifying addresses within the LFS, and wherein the metadata tier further comprises a logical layer indicating content in the CAS; and performing segment cleaning of the data tier using a SUT.

An exemplary non-transitory computer readable storage medium has stored thereon program code executable by a first computer system at a first site, the program code embodying a method comprising: receiving, at a first node, from an upload agent at a second node, a snapshot comprising object data; storing the snapshot in a primary storage in a tiered structure, wherein the tiered structure comprises a data tier and a metadata tier, wherein the data tier comprises an LFS for storing the snapshot, wherein the metadata tier comprises a CAS identifying addresses within the LFS, and wherein the metadata tier further comprises a logical layer indicating content in the CAS; and performing segment cleaning of the data tier using a SUT.

Alternatively, or in addition to the other examples described herein, examples include any combination of the following:

- performing a backup using at least the stored snapshot;
- performing a fail-over operation from the second node to a third node using at least the stored snapshot for workload recovery;
- the segment cleaning comprises determining, based at least on numbers of live blocks indicated in the SUT, a plurality of segment cleaning candidates;
- for each segment cleaning candidate of the plurality of segment cleaning candidates, determining whether a block in the segment cleaning candidate is live;
- based at least on the block not being live, marking the block as free;
- based at least on the block being live, including the block in a coalescing operation;
- based at least on access costs, calculating an expected cost of a segment cleaning operation;
- based at least on storage costs, calculating an expected cost savings from the segment cleaning;
- based at least on the expected cost of the segment cleaning and the expected cost savings from the segment cleaning, determining whether to perform the segment cleaning;
- based at least on making a determination to perform the segment cleaning, performing the segment cleaning;
- performing deduplication of the snapshot using at least the CAS;
- based at least on a retention schedule, deleting at least a portion of the snapshot or moving at least a portion of the snapshot from the primary storage to a long-term storage;
- the CAS comprises a log-structured merge-tree (LSM-tree);
- the second node comprises an SDDC;
- the snapshot comprises a versioned object difference;
- based at least on deleting the data segment, performing the segment cleaning;
- the retention schedule is linear;
- the retention schedule is non-linear;
- the third node comprises an SDDC;
- the snapshot comprises a file difference;
- the versioned object comprises a VMDK;
- the deduplication uses a unit size of at least 128 kilobytes (KB);

the SUT is stored within an LSM-tree;
the SUT comprises key-value pairs;
updating a chunk identifier (chunkID) map to de-reference deleted snapshot chunks; LFS comprises a series of log segments;
log segments on the primary storage are each at least 4 MB;
log segments on the long-term storage are each at least 40 MB;
embedding a timestamp in a key of the object;
each object has at least a 48-bit identifier; and
each snapshot has at least a 48-bit identifier.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of managing archived storage, the method comprising:
receiving, at a first node, from an upload agent at a second node, a snapshot comprising object data;
storing the snapshot in a primary storage in a tiered structure,
wherein the tiered structure comprises a data tier and a metadata tier,
wherein the data tier comprises a log-structured file system (LFS) for storing the snapshot,
wherein the metadata tier comprises a content addressable storage (CAS) identifying addresses within the LFS, and
wherein the metadata tier further comprises a logical layer indicating content in the CAS; and
performing segment cleaning of the data tier using a segment usage table (SUT).

2. The method of claim 1, further comprising:
performing a backup using at least the stored snapshot; or
performing a fail-over operation from the second node to a third node using at least the stored snapshot for workload recovery.

3. The method of claim 1, wherein the segment cleaning comprises:
determining, based at least on numbers of live blocks indicated in the SUT, a plurality of segment cleaning candidates; and
for each segment cleaning candidate of the plurality of segment cleaning candidates:
determining whether a block in the segment cleaning candidate is live;
based at least on the block not being live, marking the block as free; and
based at least on the block being live, including the block in a coalescing operation.

4. The method of claim 1, further comprising:
based at least on access costs, calculating an expected cost of a segment cleaning operation;
based at least on storage costs, calculating an expected cost savings from the segment cleaning;
based at least on the expected cost of the segment cleaning and the expected cost savings from the segment cleaning, determining whether to perform the segment cleaning; and
based at least on making a determination to perform the segment cleaning, performing the segment cleaning.

5. The method of claim 1, further comprising:
performing deduplication of the snapshot using at least the CAS; and
based at least on a retention schedule, deleting at least a portion of the snapshot or moving at least a portion of the snapshot from the primary storage to a long-term storage.

6. The method of claim 1, wherein the CAS comprises a log-structured merge-tree (LSM-tree).

7. The method of claim 1, wherein the second node comprises a software defined data center (SDDC), and wherein the snapshot comprises a versioned object difference.

8. A computer system for managing archived storage, the computer system comprising:
a processor; and
a non-transitory computer readable medium having stored thereon program code for transferring data to another computer system, the program code causing the processor to:
receive, at a first node, from an upload agent at a second node, a snapshot comprising object data;
store the snapshot in a primary storage in a tiered structure,
wherein the tiered structure comprises a data tier and a metadata tier,
wherein the data tier comprises a log-structured file system (LFS) for storing the snapshot,
wherein the metadata tier comprises a content addressable storage (CAS) identifying addresses within the LFS, and
wherein the metadata tier further comprises a logical layer indicating content in the CAS; and
perform segment cleaning of the data tier using a segment usage table (SUT).

9. The computer system of claim 8, wherein the program code is further operative to:
perform a backup using at least the stored snapshot; or
perform a fail-over operation from the second node to a third node using at least the stored snapshot for workload recovery.

10. The computer system of claim 8, wherein the program code is further operative to:
determine, based at least on numbers of live blocks indicated in the SUT, a plurality of segment cleaning candidates; and
for each segment cleaning candidate of the plurality of segment cleaning candidates:
determine whether a block in the segment cleaning candidate is live;
based at least on the block not being live, mark the block as free; and
based at least on the block being live, include the block in a coalescing operation.

11. The computer system of claim 8, wherein the program code is further operative to:
based at least on access costs, calculate an expected cost of a segment cleaning operation;
based at least on storage costs, calculate an expected cost savings from the segment cleaning;
based at least on the expected cost of the segment cleaning and the expected cost savings from the segment cleaning, determine whether to perform the segment cleaning; and
based at least on making a determination to perform the segment cleaning, perform the segment cleaning.

12. The computer system of claim 8, wherein the program code is further operative to:
perform deduplication of the snapshot using at least the CAS; and
based at least on a retention schedule, delete at least a portion of the snapshot or move at least a portion of the snapshot from the primary storage to a long-term storage.

13. The computer system of claim 8, wherein the CAS comprises a log-structured merge-tree (LSM-tree).

14. The computer system of claim 8, wherein the second node comprises a software defined data center (SDDC), and wherein the snapshot comprises a versioned object difference.

15. A non-transitory computer readable storage medium having stored thereon program code executable by a first computer system at a first site, the program code embodying a method comprising:
receiving, at a first node, from an upload agent at a second node, a snapshot comprising object data;

storing the snapshot in a primary storage in a tiered structure,
  wherein the tiered structure comprises a data tier and a metadata tier,
  wherein the data tier comprises a log-structured file system (LFS) for storing the snapshot,
  wherein the metadata tier comprises a content addressable storage (CAS) identifying addresses within the LFS, and
  wherein the metadata tier further comprises a logical layer indicating content in the CAS; and
performing segment cleaning of the data tier using a segment usage table (SUT).

16. The non-transitory computer readable storage medium of claim 15, wherein the program code further comprises:
  performing a backup using at least the stored snapshot; or
  performing a fail-over operation from the second node to a third node using at least the stored snapshot for workload recovery.

17. The non-transitory computer readable storage medium of claim 15, wherein the program code further comprises:
  determining, based at least on numbers of live blocks indicated in the SUT, a plurality of segment cleaning candidates; and
  for each segment cleaning candidate of the plurality of segment cleaning candidates:
    determining whether a block in the segment cleaning candidate is live;
    based at least on the block not being live, marking the block as free; and
    based at least on the block being live, including the block in a coalescing operation.

18. The non-transitory computer readable storage medium of claim 15, wherein the program code further comprises:
  based at least on access costs, calculating an expected cost of a segment cleaning operation;
  based at least on storage costs, calculating an expected cost savings from the segment cleaning;
  based at least on the expected cost of the segment cleaning and the expected cost savings from the segment cleaning, determining whether to perform the segment cleaning; and
  based at least on making a determination to perform the segment cleaning, performing the segment cleaning.

19. The non-transitory computer readable storage medium of claim 15, wherein the program code further comprises:
  performing deduplication of the snapshot using at least the CAS; and
  based at least on a retention schedule, deleting at least a portion of the snapshot or moving at least a portion of the snapshot from the primary storage to a long-term storage.

20. The non-transitory computer readable storage medium of claim 15, wherein the CAS comprises a log-structured merge-tree (LSM-tree), wherein the second node comprises a software defined data center (SDDC), and wherein the snapshot comprises a versioned object difference.

* * * * *